United States Patent
Popli et al.

(10) Patent No.: US 9,699,108 B2
(45) Date of Patent: *Jul. 4, 2017

(54) PEER-ASSISTED DEPLOYMENT OF RESOURCES IN A NETWORK

(71) Applicant: Dell Products L.P., Round Rock, TX (US)

(72) Inventors: Sumit Popli, Santa Clara, CA (US); Jigar Shah, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,418

(22) Filed: Feb. 18, 2016

(65) Prior Publication Data

US 2016/0164799 A1     Jun. 9, 2016

Related U.S. Application Data

(63) Continuation of application No. 14/185,549, filed on Feb. 20, 2014, now Pat. No. 9,300,535.

(51) Int. Cl.
*H04L 12/24* (2006.01)
*H04L 12/911* (2013.01)
*H04L 12/26* (2006.01)

(52) U.S. Cl.
CPC .......... *H04L 47/70* (2013.01); *H04L 41/0816* (2013.01); *H04L 41/0853* (2013.01); *H04L 43/0805* (2013.01); *H04L 43/0817* (2013.01); *H04L 41/0879* (2013.01)

(58) Field of Classification Search
CPC ...................................... H04L 12/24
USPC ......................................................... 709/226
See application file for complete search history.

(56) References Cited

U.S. PATENT DOCUMENTS

| | | |
|---|---|---|
| 8,108,455 B2 | 1/2012 | Yeager et al. |
| 8,478,849 B2 | 7/2013 | Marl et al. |
| 2003/0061323 A1 | 3/2003 | East et al. |
| 2008/0052384 A1 | 2/2008 | Marl et al. ..................... 709/223 |
| 2012/0284684 A1 | 11/2012 | Michaely et al. ............ 717/103 |

OTHER PUBLICATIONS

Pivcon, Inc. "Built for Speed," Available Online at: http://www.pivcon.com/products/built-for-speed/ ( 1 page), 2014.

*Primary Examiner* — David Lazaro
*Assistant Examiner* — Zia Khurshid
(74) *Attorney, Agent, or Firm* — Baker Botts L.L.P.

(57) ABSTRACT

In particular embodiments, a server computing device receives one or more inputs specifying a software module and one or more portions of a network. Each of the portions of the network includes multiple client devices. For each of the client devices in a portion of the network, the server computing device determines whether the client device meets one or more criteria. For at least one portion of the network having a client device meeting the one or more criteria, the server computing device selects the client device as a master device and provides the software module to the master device. The master device is operable to download the software module from one or more server computing devices, provide the software module to the other client devices in the portion of the network, and provide status information to the server computing device.

20 Claims, 3 Drawing Sheets

PEER-ASSISTED DEPLOYMENT OF RESOURCES IN A NETWORK

CROSS-REFERENCE TO RELATED APPLICATION

This application is a continuation of application Ser. No. 14/185,549 titled "Peer-Assisted Deployment of Resources in a Network," filed Feb. 20, 2014, which is incorporated herein by reference.

TECHNICAL FIELD

This disclosure relates generally to information handling systems and, more particularly, to networks having multiple client devices.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
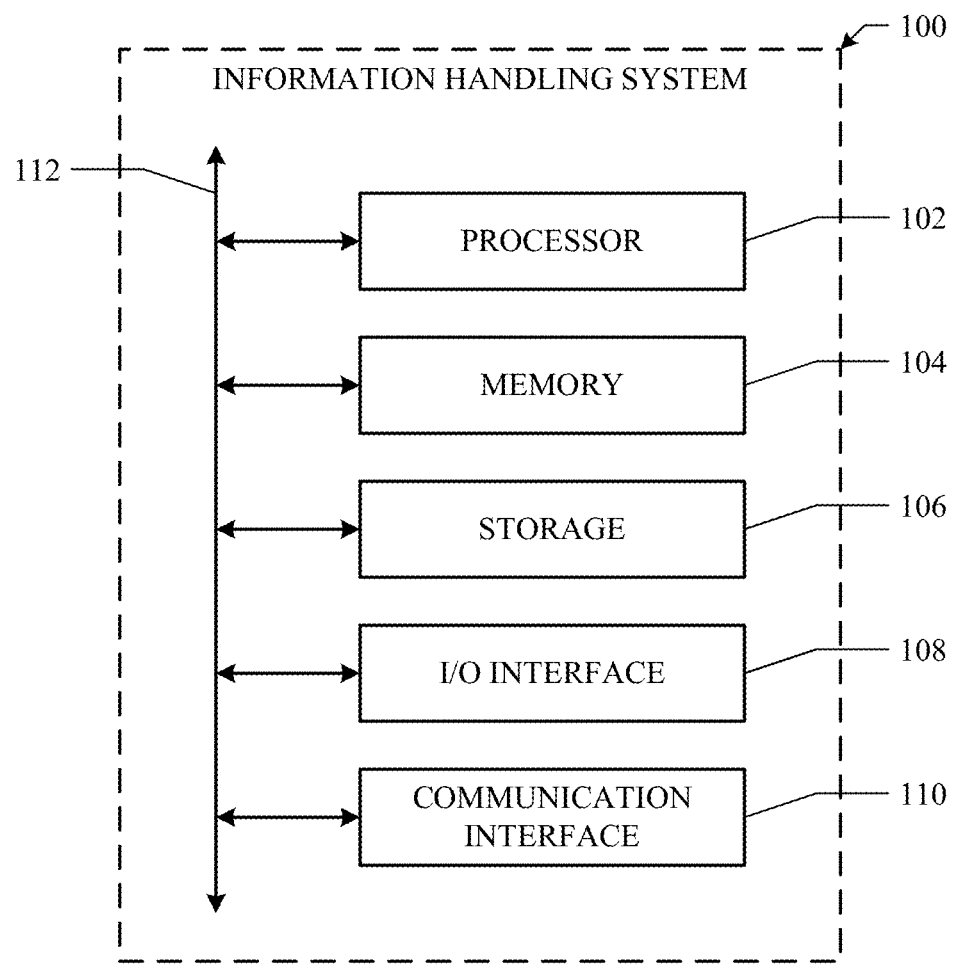
FIG. 1 is a block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Figure 2:
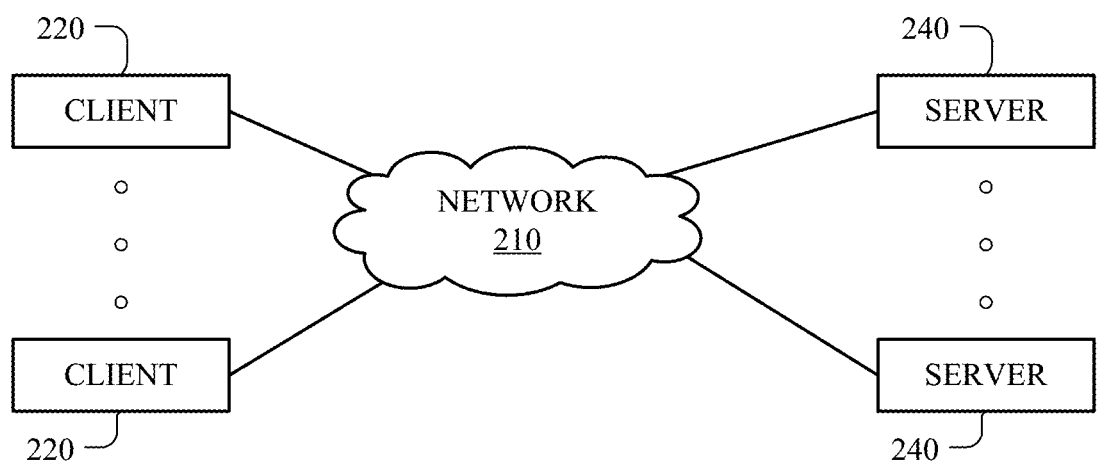
FIG. 2 is an example of a network environment.
Figure 3:
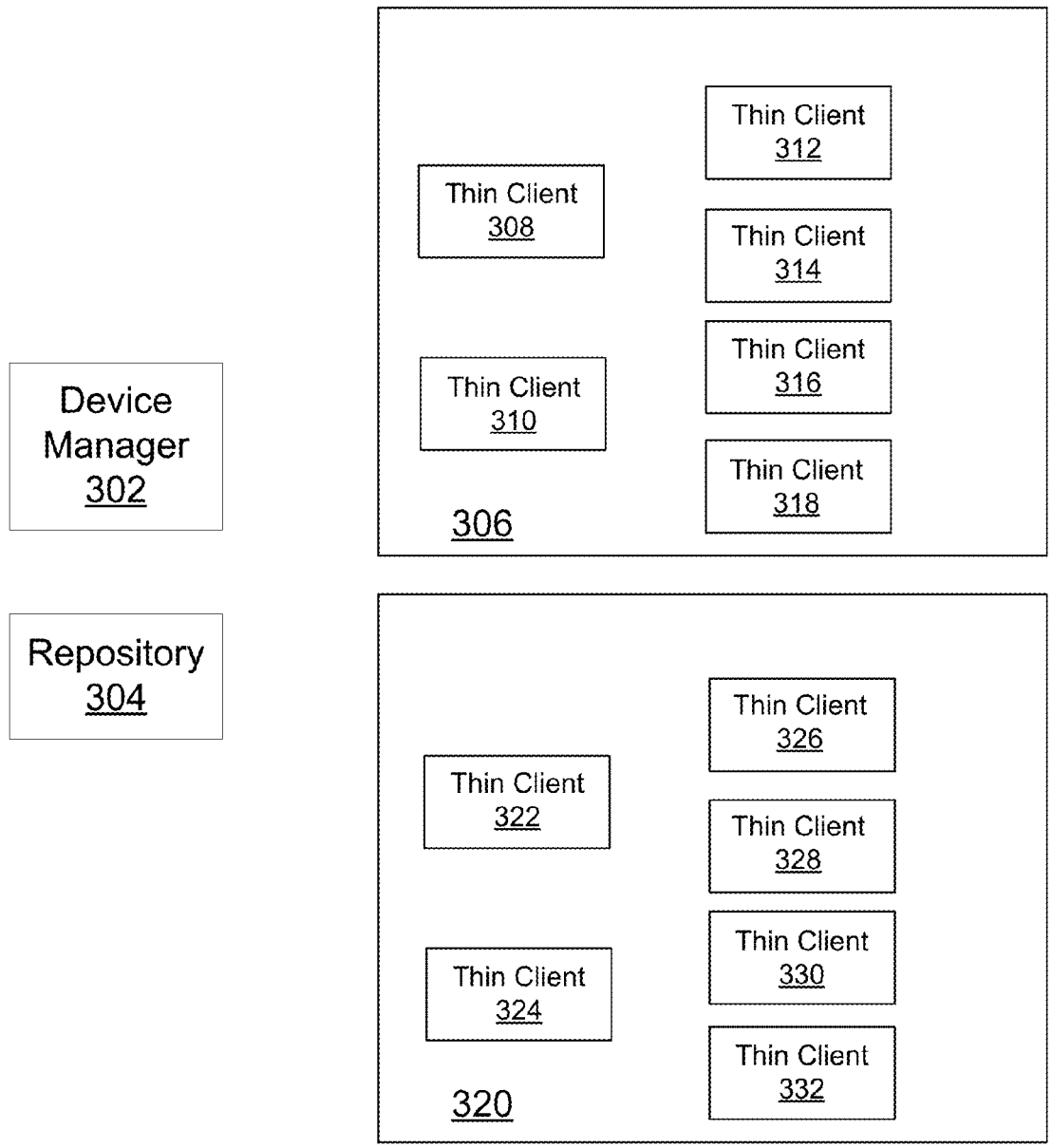
FIG. 3 an example of a network environment including multiple client devices.

Particular embodiments are best understood by reference to FIGS. 1-3, wherein like numbers are used to indicate like and corresponding parts.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a Universal Serial Bus (USB) drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

FIG. 2 illustrates an example configuration of networked information handling systems (e.g. client devices and servers). In particular embodiments, one or more client devices 220 and one or more servers 240 are connected via network 210. Network 210 may be a public network or a private (e.g. corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. A client device 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g. corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

It may be desirable, in the case of a private (e.g. corporate) network including multiple sites or subnets to deploy software (including, e.g., all or part of one or more operating systems, applications, add-ons, or data) to one or more client devices 220 across one or more sites or subnets. The client devices 220 may, for example, be located remotely from one or more servers 240 (including, e.g., device managers or resource repositories), and as such, there may be challenges in deploying software or other resources to the client devices. As an example, limited connectivity or limited speed due to bandwidth constraints or network latencies may create delays in deploying software. As another example, remote sites or subnets may not include managed components or may not have any personnel with information technology expertise necessary to implement software deployment to client devices at the sites or subnets. Additionally, as the size of operating system images or other content (e.g. videos) increases, deploying software or other data to remote sites or subnets may be further delayed. These issues may be further exacerbated in the case of embedded computers such as thin clients, which may have limited processing capability and limited storage space. Traditional approaches involving using a static remote software repository for each subnet or site may not be feasible due to cost or management and monitoring requirements.

In particular embodiments, one or more servers 240 of a network 210 may include a device manager that may manage one or more client devices 220 (e.g. thin clients) of one or more sites or subnets of the network. The device manager may, for example, be a software-based management tool that allows for software imaging, software updates, and software configurations to be deployed to the clients from one or more servers. The device manager may also perform any other suitable management function to manage client devices including, for example, enabling or performing (e.g. automatically) device discovery, tracking of assets (e.g. hardware or software inventory) at client devices, monitoring the status or health of client devices, applying one or more policies to client devices (including, e.g., network settings of the client devices), or remote administration and shadowing of client devices. The device manager may deliver any suitable resources including, for example, operating systems, add-ons, content, or any other suitable data, applications, or images to one or more thin client devices 220 of network 210.

In particular embodiments, the device manager may deploy resources to thin client devices across multiple subnets or sites in a network via a peer-assisted process that involves selecting one or two (or any suitable number) of thin clients in each subnet or site as a "master" device, and then using the master device or devices to deploy resources to other client devices within the respective subnet or site. The master devices serve as the peers from which other client devices within a subnet or site may be deployed resources. The number of master devices in each site or subnet may, for example, be configurable (e.g. a setting at the device manager). The device manager may control all or part of the process. The device manager of a network may determine which thin clients in a subnet or site of the network may be designated as master devices based on one or more characteristics of the thin clients in the subnet or site. As an example, the device manager may determine which of the thin clients in the subnet or site have recently checked in (e.g. via a network status update) with the device manager. In particular embodiments, those clients who have most recently checked-in are better candidates to be designated as master devices than those clients whose last check-in was before some predetermined amount of time, such as the past 24 hours, or those clients who have not checked in during a particular time period or who have missed a certain number of check-ins. As other examples, the device manager may select as master devices only those thin clients having more than a certain amount of storage space (e.g. sufficient to store required software or data for deployment given current usage of the thin client), having more than a certain amount of available processing ability (e.g. to be able to process the deployment tasks), having more than a certain network bandwidth capability (e.g. to efficiently download the deployment software or data), having required server components (e.g. to serve as a subnet- or site-specific repository), or being capable of performing delayed updates (e.g. to download an image in the background). The device manager may, in particular embodiments, store a list (e.g. a database) of candidate devices in each subnet or site that may be chosen to be a master device based on one or more criteria including those listed herein. From this list, the device manager may select one or two (or any suitable number) of thin clients in each subnet or site to be the master devices for the subnet or site. The device manager may, in particular embodiments, select the master devices within a subnet or site upon receiving a user's command (e.g. via a user interface, described herein) to deploy a software package to client devices in the subnet or site via the peer-assisted process. Although reference is made to thin client devices in one or more subnets or sites, the peer-assisted deployment process may be used with any suitable client device (including, e.g., smartphones or tablet computers).

FIG. 3 illustrates an example embodiment of a network architecture for deployment of resources to multiple thin clients across two subnets. In the example of FIG. 3, device manager 302 and repository 304 (which are examples of servers 240) are located remotely from thin client devices in two subnets, 306 and 320, of a network (e.g. a network 210, which may be a private corporate network). Device manager 302 may manage the deployment of resources from repository 304 to one or more of the thin clients in subnet 306 or subnet 320. In particular embodiments, device manager 302 and repository 304 may be part of a single server, and in yet other embodiments, they may each be part of different servers. Repository 304 may, for example, be an HTTPS, HTTP, FTP, or CIFS-compatible repository, and the protocol used to deploy resources may be selected by an administrator interacting with the device manager 302. In the example of FIG. 3, device manager 302 may select two thin clients in each subnet to be the master devices for the subnet. Thin clients 308 and 310 are selected by device manager 302 to be the master devices for subnet 306, and thin clients 322 and 324 are selected to be the master devices for subnet 320.

Once the device manager selects the thin clients that are to be master devices in each subnet or site of interest, the master devices are imaged from a repository (e.g. residing on one or more servers 240 of network 210). In the example of FIG. 3, thin clients 308 and 310 in subnet or site 306 and thin clients 322 and 324 in subnet or site 320 receive resources for deployment (e.g. software or data) from repository 304. Once imaging of the master devices in each subnet or site is complete (and the imaged master devices are each converted into a subnet- or site-specific repository), the device manager is notified by each of the imaged master devices. At this point, the device manager may then communicate with and notify one or more secondary devices in each subnet or site (e.g. those thin clients in the subnet or site that are not the master devices) that they may access the resources to be deployed at the master device or devices in their respective subnet or site. In particular embodiments, a particular number (e.g., half) of the secondary devices in a subnet may be notified that they may access resources at a first master device in the subnet or site, and the remainder of the secondary devices in the subnet or site may be notified that they may access resources at a second master device in the subnet or site. The secondary devices of a subnet or site may be imaged in multiple cycles or batches. A subnet or site may include any suitable number of master devices (including, e.g., only one), and the secondary devices in the subnet or site may be notified that they may access resources at a particular master device in the subnet or site according to any suitable algorithm or scheme. Additionally, a master device may be assigned to no more than a predetermined number of (e.g. 7) secondary devices for updating at any moment in time. In particular embodiments, a secondary device in a subnet or site may only access resources to be deployed from its assigned master device in the subnet or site after providing authentication information (e.g. a stored key or password) to the master device. Additionally, the master devices in each subnet or site (and/or the device manager for the network) may include a whitelist of approved thin clients in the subnet or site and/or a blacklist of thin clients that may not access resources at the master devices. In particular embodiments, a master device and a secondary device in a particular subnet or site may communicate via an encrypted connection (e.g. using the Secure Shell protocol), such that any deployment of resources from the master device to the secondary device is secure. In other embodiments, a master device and its secondary devices may communicate via an unencrypted connection. Once the secondary devices in each subnet or site have connected to their respective master devices in the subnet or site and completed downloading of the resources to be deployed (e.g. an operating system, an application, or an image), the device manager may be notified. In particular embodiments, the device manager may communicate with the master devices and/or the secondary devices in each subnet or site to maintain up-to-date (e.g. dynamic) status information including which devices are the master devices in a given subnet or site and the status of the deployment of resources to each of the secondary devices (e.g. a download progress indicator for those secondary devices accessing resources at a master device). If a secondary device fails to obtain resources (e.g. an image) from a master device, the secondary device may retry some predetermined number of times (e.g., once, twice, or three times); if the secondary device still fails after retrying, it may report failure to the device manager. Once all of the secondary devices in a subnet or site have completed their updating (e.g. downloading of the resource to be deployed from a master device) or have reported failure, the device manager may instruct one or more of the master devices in the subnet or site to delete the resource (e.g. an image) that was downloaded to the master devices. In this manner, the master devices of a subnet or site may be "cleaned up" to enable them to have space for future deployment of resources. In particular embodiments, a master device of a subnet need not have additional space for downloading and storing a resource (e.g. an operating system or image), as the master device may directly capture or copy a "live" version of the resource (e.g. the operating system or image) currently running on the master device and provide it to other client devices in its subnet or site.

In particular embodiments, or more newly-updated client devices of a network (e.g. across one or more subnets) may be used to update other client devices in the network. For example, once a secondary device is updated (e.g. from a master device within its subnet), the secondary device may then automatically communicate with the device manager, notifying the device manager that it has been updated. The device manager may then select this secondary device to be a new master device for the subnet, and may proceed to instruct as-yet-unupdated secondary devices in the subnet to obtain images (or other resources) from this new master device. In this manner, the deployment of resources (e.g. software packages or images), beginning from a single repository (e.g. repository 304), may proceed at a geometric pace, without consuming an excessive amount of bandwidth between the servers of the network (e.g. the device manager and repository) and the client devices of the subnets or sites of the network. As described herein, the device manager may create a list (e.g. a database) of candidate client devices in each subnet or site that may be chosen to be a master device (e.g. a client device capable of being a subnet- or site-specific repository). In particular embodiments, the device manager may also maintain a list, for each subnet or site, of client devices that are to become subnet- or site-specific repositories after being imaged or updated (e.g. by a master device via the peer-assisted deployment process). The list may, for example, indicate a minimum number of client devices (e.g. 7) in a subnet or site that are selected to be "new" master devices after imaging or updating. These "new" master devices may then become part of a pool of master devices in the subnet or site that may work to image or update all remaining secondary client devices in the subnet. As an example, the "original" or first set of master devices in a subnet or site may become "root master" devices that image or update a first set of secondary devices. The secondary devices in this first set may then, in turn, become "new" master devices and then image or update an additional set of secondary devices, and so on in a geometric progression. This process may significantly reduce the overall time to image or update an entire set of client devices in a subnet or site (e.g. location). The algorithm for selecting client devices for the list of future subnet- or site-specific repositories may vary based on any suitable criteria including, for example, the class of subnet, a user exclusion list, and/or the other criteria described herein, such as time since last check-in or available free space.

In particular embodiments, the peer-assisted deployment process may occur at a memory block level (in contrast to, for example, a file level or software package level), and each master device may receive one or more memory blocks that are then deployed to one or more secondary devices. In particular embodiments, repository 304 may be a server computing device associated with a cloud services provider and may, for example, be located remotely from device manager 302. Such a cloud services provider may provide operating systems, images, or any other suitable resource to be deployed to one or more client devices of a network (including, e.g., a private network).

In particular embodiments, a device manager of a network may include a user interface that allows a user (e.g. a system administrator) to adjust one or more settings associated with the deployment of resources to one or more client devices in one or more subnets or sites of the network. The user interface may, for example, allow the user to select one or more packages (including any suitable combination of updates, configurations, or images) to be deployed in one or more subnet or sites of the network. The user interface may display relevant information associated with a package including, for example, release version, date created, size, platform, operating system, status, or any other suitable information. The user interface may also allow the user to search for and specify which subnet or subnets (or sites) of the network will receive the deployment of the packages during, for example, a particular time period (e.g. a maintenance interval). The user interface may display one or more subnets or sites available for selection by the user and may include each subnet or site's IP address, a description (e.g. a nickname or a site name) of the subnet or site, the number of devices associated with the subnet or site, the status of the subnet or site, and/or any other suitable information regarding the subnets or sites of the network. The particular time period or maintenance interval for deployment may, for example, be set to a default value or may be specified by a user using a start time/date and a stop time/date (and may be set as a recurring event). In particular embodiments, a user may input scheduling preferences that may govern the deployment of resources to client devices. In particular embodiments, the user may specify the maximum number of simultaneous packages being deployed, the number of minutes to wait to determine whether a client device has timed out, the maximum number of times to attempt rescheduling a failed package deployment, or any other suitable scheduling preference. The user may also specify that the time zone for the maintenance interval (defined by start and stop dates/times) be that of: (1) the device manager (e.g. 302), (2) the repository (e.g. 304), or (3) each device receiving a deployment (e.g. a thin client master device or secondary device). Once the stop time of the maintenance interval is reached (in the relevant time zone), then the process will stop further deployments and may, for example, restart the process during the next scheduled maintenance interval (e.g. the next day at the same start time). A user may also "pause," "play," or cancel a deployment process; for example, a user may halt (e.g. temporarily or permanently, in the case of a cancellation) an in-process (or scheduled) deployment, and a user may also cause a halted deployment to resume via the user interface. In particular embodiments, if a client device is added to a subnet or site during a maintenance interval (e.g. after the start date/time and before the stop date/time), then the client device may be included in the peer-assisted deployment process and may be updated along with the existing secondary devices in the subnet or site. However, if a client device is added after a maintenance interval and before the start of another maintenance interval for the subnet or site, then the client device must either be updated with the desired resources in a different fashion (e.g. manually by a system administrator using a Drag and Drop method) or must wait to be updated until the next peer-assisted deployment maintenance interval for the subnet or site.

In particular embodiments, the device manager, upon receiving a user command for deployment (e.g. a pressing of a "deploy" button in a user interface), may check a database (e.g. a database or list of candidate master devices) to determine how many candidate devices in the user-selected subnet or site may act as a master device or subnet- or site-specific repository. If the device manager does not find at least one suitable device within a particular selected subnet or site, then the device manager may warn the user (e.g. via a user interface) that there is no suitable device in the subnet or site that may serve as a peer. This may indicate to the user that issues specific to the subnet or site may need to be resolved. The user interface may prompt the user to deselect the subnet or site before proceeding with deployment instructions for other subnets or sites. The device manager may then populate a peer-to-peer command table with the deployment packages for those devices that belong to the selected subnets or sites having at least one candidate master device. In particular embodiments, the device manager (e.g. a user interface of the device manager) may receive a regular "refresh device" command. This refresh command may contain details of a certain number (e.g. a predetermined but configurable number, such as 25) candidate master devices per subnet or site. As disclosed herein, the device manager may chose a particular number (e.g. one or two) of master devices from the candidates for a particular subnet or site and proceed with the peer-assisted deployment process described herein.

As disclosed herein, in particular embodiments, the device manager may communicate with the master devices and/or the secondary devices in each subnet or site to maintain up-to-date (e.g. dynamic) status information. This status information may, for example, be displayed to a user (e.g. a system administrator for a network) in communication with the device manager (e.g. via a user interface). That status information for a subnet or site may be any suitable information including which devices are the master devices in a given subnet or site and the status of the deployment of resources to each of the secondary devices (e.g. a download progress indicator for those secondary devices accessing resources at a master device). The status information may include an indication of whether a particular device (e.g. a master device or secondary device) or a particular subnet or site has completed its updating (and if not, what the progress is, e.g., as a percentage) or whether there has been a failure along the way. The status information may be at any suitable granularity (e.g. device-level, subnet- or site-level, or overall deployment-level). Example status indicators for a subnet or site may indicate that a master device is being selected, that a master device is being imaged, or that one or more secondary devices are being imaged. Example status indicators for a particular master device within a subnet or site may indicate that the particular master device is being imaged, that the particular device failed to be selected (e.g. by the device manager, automatically) as a master device, or that the particular device is imaging one or more secondary devices. In particular embodiments, the device manager receives a report or list (e.g. dynamically generated or regularly generated) of failed or "bad" master devices in each of one or more subnets or sites of the network, and an administrator of the network may then manually purge or update those devices. Alternatively, the "bad" or failed master devices may be automatically purged from a list of candidate master devices, and any other suitable actions may be taken by the device manager with respect to these failed master devices. Example status indicators for a group (or batch) of one or more secondary devices may indicate an assigned master device within the subnet or site (e.g. if multiple master devices are chosen within the subnet or site), a group indicator (e.g. if multiple groups of secondary devices exist within the subnet or site), the number of devices in the group, the number of devices in the group that have been successfully imaged, the number of devices in the group that have failed to be imaged, and the number of devices in the group whose imaging is in process. In particular embodiments, master devices, secondary devices, or both may also report errors due to lack of sufficient storage space (e.g. to receive an image that is being deployed), lack of sufficient network connectivity, or any download errors that may have occurred at the devices. Any suitable status information may be communicated between the device manager and the devices of the network across multiple subnets or sites.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
managing by a device manager deployment of one or more resources from a repository;
for each of one or more portions of a network, for each of a plurality of client devices in the one or more portions of the network, determining whether one or more of the plurality of client devices meets one or more criteria;
storing the one or more of the plurality of client devices that meet the one or more criteria as one or more candidate devices in a list;
selecting at least one of the one or more candidate devices from the list as a master device for the one or more portions of the network;
converting the master device to a designated repository, wherein the designated repository is associated with a designated portion of the one or more portions of the network;
receiving a notification from the designated repository after completion of the conversion of the master device to the designated repository;
assigning up to a threshold of the plurality of client devices that are not the master device to the designated repository;
downloading at least one of the one or more resources to the designated repository;
notifying the assigned client devices that the at least one of the one or more resources is accessible;
receiving a connection notification for the assigned client devices that successfully connected to the designated repository;
imaging at least one of the assigned client devices with the at least one of the one or more resources;
receiving status information associated with imaging of the at least one of the one or more resources at the at least one assigned client devices;
selecting by the device manager at least one of the one or more assigned client devices based on the status information as a new master device, wherein the status information indicates if imaging was successful; and
instructing by the device manager at least one of the one or more assigned client devices that has yet to be successfully imaged as indicated by the status information to obtain the at least one of the one or more resources from the new master device.

2. The method of claim 1, wherein the one or more resources are selected via a graphical user interface.

3. The method of claim 1, wherein the at least one of the one or more resources comprises one or more of the following:
an operating system;
an image;
an add-on; or
an update.

4. The method of claim 1, wherein:
the at least one of the one or more resources comprises an image or an operating system;
the designated repository is currently running the operating system or the image; and
the designated repository is operable to provide the operating system or the image to any one or more assigned client devices by copying the running operating system or the image.

5. The method of claim 1, wherein the one or more portions of the network comprise one or more subnets.

6. The method of claim 1, wherein the one or more portions of the network comprise one or more sites.

7. The method of claim 1, wherein the assigned client devices comprise thin client devices.

8. The method of claim 1, wherein the criteria include one or more of:
a network bandwidth capability;
a number of missed check-ins with the server computing device;
an amount of available storage; or
an amount of available processing capacity.

9. An information handling system comprising:
one or more processors; and
a memory coupled to the processors comprising instructions executable by the processors, the processors being operable when executing the instructions to:
manage by a device manager deployment of one or more resources from a repository;
for each of one or more portions of a network, for each of a plurality of client devices in the one or more portions of the network, determine whether one or more of the plurality of client devices meets one or more criteria;
store the one or more of the plurality of client devices that meet the one or more criteria as one or more candidate devices in a list;
select at least one of the one or more candidate devices from the list as a master device for the one or more portions of the network;

convert the master device to a designated repository, wherein the designated repository is associated with a designated portion of the one or more portions of the network;

receive a notification from the designated repository after completion of the conversion of the master device to the designated repository;

assign up to a threshold of the plurality of client devices that are not the master device to the designated repository;

download at least one of the one or more resources to the designated repository;

notify the assigned client devices that the at least one of the one or more resources is accessible;

receive a connection notification for the assigned client devices that successfully connected to the designated repository;

image at least one of the assigned client devices with the at least one of the one or more resources;

receive status information associated with imaging of the at least one of the one or more resources at the at least one of the assigned client devices;

select by the device manager at least one of the one or more assigned client devices based on the status information as a new master device, wherein the status information indicates if imaging was successful; and instruct by the device manager at least one of the one or more assigned client devices that has yet to be successfully imaged as indicated by the status information to obtain the at least one of the one or more resources from the new master device.

10. The information handling system of claim 9, wherein the one or more resources are selected via a graphical user interface.

11. The information handling system of claim 9, wherein the at least one of the one or more resources comprises one or more of the following:
   an operating system;
   an image;
   an add-on; or
   an update.

12. The information handling system of claim 9, wherein:
   the at least one of the one or more resources comprises an image or an operating system;
   the designated repository is currently running the operating system or the image; and
   the designated repository is operable to provide the operating system or the image to any one or more assigned client devices by copying the running operating system or the image.

13. The information handling system of claim 9, wherein the one or more portions of the network comprise one or more subnets.

14. The information handling system of claim 9, wherein the one or more portions of the network comprise one or more sites.

15. The information handling system of claim 9, wherein the assigned client devices comprise thin client devices.

16. The information handling system of claim 9, wherein the criteria include one or more of:
   a network bandwidth capability;
   a number of missed check-ins with the server computing device;
   an amount of available storage; or
   an amount of available processing capacity.

17. One or more computer-readable non-transitory storage media embodying software that is operable when executed to:
   manage by a device manager deployment of one or more resources from a repository;
   for each of one or more portions of a network, for each of a plurality of client devices in the one or more portions of the network, determine whether one or more of the plurality of client devices meets one or more criteria;
   store the one or more of the plurality of client devices that meet the one or more criteria as one or more candidate devices in a list;
   select at least one of the one or more candidate devices from the list as a master device for the one or more portions of the network;
   convert the master device to a designated repository, wherein the designated repository is associated with a designated portion of the one or more portions of the network;
   receive a notification from the designated repository after completion of the conversion of the master device to the designated repository;
   assign up to a threshold of the plurality of client devices that are not the master device to the designated repository;
   download at least one of the one or more resources to the designated repository;
   notify the assigned client devices that the at least one of the one or more resources is accessible;
   receive a connection notification for the assigned client devices that successfully connected to the designated repository;
   image at least one of the assigned client devices with the at least one of the one or more resources;
   receive status information associated with imaging of the at least one of the one or more resources at the at least one of the assigned client devices;
   select by the device manager at least one of the one or more assigned client devices based on the status information as a new master device, wherein the status information indicates if imaging was successful; and
   instruct by the device manager at least one of the one or more assigned client devices that has yet to be successfully imaged as indicated by the status information to obtain the at least one of the one or more resources from the new master device.

18. The information handling system of claim 17, wherein the one or more resources are selected via a graphical user interface.

19. The information handling system of claim 17, wherein the at least one of the one or more resources comprises one or more of the following:
   an operating system;
   an image;
   an add-on; or
   an update.

20. The information handling system of claim 17, wherein:
   the at least one of the one or more resources comprises an image or an operating system;
   the designated repository is currently running the operating system or the image; and
   the designated repository is operable to provide the operating system or the image to any one or more assigned client devices by copying the running operating system or the image.

* * * * *